(12) United States Patent
Radwanski et al.

(10) Patent No.: US 11,761,342 B2
(45) Date of Patent: Sep. 19, 2023

(54) SEALING ASSEMBLY FOR A GAS TURBINE ENGINE HAVING A LEAF SEAL

(71) Applicant: General Electric Company, Schenectady, NY (US)

(72) Inventors: Michael Todd Radwanski, Newport, KY (US); Darrell Glenn Senile, Oxford, OH (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 17/079,893

(22) Filed: Oct. 26, 2020

(65) Prior Publication Data

US 2022/0127967 A1 Apr. 28, 2022

(51) Int. Cl.
  *F01D 11/00* (2006.01)
  *F02C 7/28* (2006.01)

(52) U.S. Cl.
  CPC .......... *F01D 11/005* (2013.01); *F01D 11/001* (2013.01); *F02C 7/28* (2013.01); *F05D 2220/323* (2013.01); *F05D 2240/35* (2013.01); *F05D 2240/57* (2013.01); *F05D 2260/30* (2013.01)

(58) Field of Classification Search
  CPC ............. F05D 2240/30; F05D 2240/57; F05D 2220/323; F05D 2260/38; F01D 11/001; F01D 11/005; F01D 9/023; F16J 15/3288
  See application file for complete search history.

(56) References Cited

U.S. PATENT DOCUMENTS

| 4,813,608 | A | | 3/1989 | Holowach et al. | |
|---|---|---|---|---|---|
| 4,815,933 | A | | 3/1989 | Hansel et al. | |
| 5,118,120 | A | * | 6/1992 | Drerup | F16J 15/021 415/173.7 |
| 5,265,412 | A | * | 11/1993 | Bagepalli | F02K 1/805 277/355 |
| 5,549,305 | A | * | 8/1996 | Freund | F16J 15/186 15/317 |
| 5,797,723 | A | * | 8/1998 | Frost | F01D 11/005 415/231 |
| 6,843,482 | B1 | * | 1/2005 | Bayne | F16J 15/002 277/412 |
| 7,600,967 | B2 | | 10/2009 | Pezzetti, Jr. et al. | |
| 8,257,028 | B2 | | 9/2012 | Morgan et al. | |

(Continued)

*Primary Examiner* — Eugene G Byrd
*Assistant Examiner* — L. Susmitha Koneru
(74) *Attorney, Agent, or Firm* — Dority & Manning, P.A.

(57) ABSTRACT

A sealing assembly for a gas turbine engine. The sealing assembly includes first and second gas turbine walls defining a channel therebetween. Additionally, the second gas turbine wall further defines a passage extending therethrough. Furthermore, the sealing assembly includes a leaf seal partially positioned within the channel and a seal holder coupled to the second gas turbine wall. Moreover, the sealing assembly includes a spring compressed between the seal holder and the leaf seal such that the leaf seal is in sealing engagement with the first gas turbine wall. In addition, the sealing assembly includes a pin extending through the passage defined by the second gas turbine wall to couple the seal holder and the leaf seal such that the pin is thermally unconstrained by the second wall during operation of the gas turbine engine.

14 Claims, 6 Drawing Sheets

(56) References Cited

U.S. PATENT DOCUMENTS

| | | | | |
|---|---|---|---|---|
| 8,459,041 B2* | 6/2013 | Flanagan | ................ | F01D 9/023 |
| | | | | 60/800 |
| 8,701,415 B2* | 4/2014 | Flanagan | .............. | F01D 11/005 |
| | | | | 277/312 |
| 8,702,374 B2 | 4/2014 | Butler | | |
| 8,720,898 B2* | 5/2014 | Shires | .................... | F01C 19/04 |
| | | | | 277/306 |
| 9,115,585 B2* | 8/2015 | Melton | ................... | F01D 9/023 |
| 9,506,374 B2* | 11/2016 | Batt | ...................... | F01D 25/24 |
| 9,828,868 B2 | 11/2017 | Guinn et al. | | |
| 10,190,430 B2* | 1/2019 | Leglaye | .................. | F23R 3/002 |
| 10,400,616 B2 | 9/2019 | Tuertscher et al. | | |
| 2002/0117807 A1* | 8/2002 | Yoshida | ................ | F16J 15/441 |
| | | | | 277/412 |
| 2006/0125190 A1* | 6/2006 | Addis | ................ | F16J 15/3288 |
| | | | | 277/355 |
| 2007/0284832 A1* | 12/2007 | Wunderlich | ............ | F01D 9/023 |
| | | | | 277/594 |
| 2011/0008163 A1* | 1/2011 | Prentice | ................. | F01D 5/282 |
| | | | | 415/208.1 |
| 2013/0315721 A1* | 11/2013 | Lawson, Jr. | ............ | F01D 25/30 |
| | | | | 415/182.1 |
| 2016/0305286 A1* | 10/2016 | Heitman | ................... | F02C 7/20 |
| 2018/0372229 A1* | 12/2018 | Bidkar | ................... | F16J 15/445 |
| 2021/0079812 A1* | 3/2021 | Troughton | .............. | F02C 7/222 |

\* cited by examiner

SEALING ASSEMBLY FOR A GAS TURBINE ENGINE HAVING A LEAF SEAL

FEDERALLY SPONSORED RESEARCH

This invention was made with government support. The government may have certain rights in the invention.

FIELD

The present disclosure generally pertains to sealing assemblies for gas turbine engines, and, more specifically, to a sealing assembly for a gas turbine engine having a leaf seal.

BACKGROUND

A gas turbine engine generally includes a compressor section, a combustion section, and a turbine section. More specifically, the compressor section progressively increases the pressure of air entering the gas turbine engine and supplies this compressed air to the combustion section. The compressed air and a fuel mix within the combustion section and burn within a combustion chamber to generate high-pressure and high-temperature combustion gases. The combustion gases flow through a hot gas path defined by the turbine section before exiting the engine. In this respect, the turbine section converts energy from the combustion gases into rotational energy. This rotational energy is, in turn, used to rotate one or more shafts, which drive the compressor section and/or a fan assembly of the gas turbine engine.

The turbine section includes various stationary components (e.g., stator vanes, turbine shrouds, shroud supports, etc.) that partially define the hot gas path through the turbine section. While the components defining the hot gas path are able to withstand prolonged exposure to the combustion gases, the components positioned outside of the hot gas path (e.g., the turbine casing) typically have less favorable thermal properties. In this respect, metallic leaf seals are positioned between adjacent stationary components to minimize the leakage of the combustion gases from the hot gas path.

In recent years, the use of composite materials, such as ceramic matrix composite (CMC) materials, within gas turbine engines has grown dramatically. For example, stator vanes are commonly formed from CMC materials to reduce the weight of and/or increase the operating temperature range of the engine. However, the use of composite materials in gas turbine engines presents various challenges. For example, it is difficult to couple metallic leaf seals to composite gas turbine components.

Accordingly, an improved sealing assembly for a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a sealing assembly for a gas turbine engine. The sealing assembly includes a first gas turbine wall and a second gas turbine wall spaced apart from the first gas turbine wall, with the first and second gas turbine walls defining a channel therebetween. Additionally, the second gas turbine wall further defines a passage extending therethrough. Furthermore, the sealing assembly includes a leaf seal partially positioned within the channel and a seal holder coupled to the second gas turbine wall. Moreover, the sealing assembly includes a spring compressed between the seal holder and the leaf seal such that the leaf seal is in sealing engagement with the first gas turbine wall. In addition, the sealing assembly includes a pin extending through the passage defined by the second gas turbine wall to couple the seal holder and the leaf seal such that the pin is thermally unconstrained by the second wall during operation of the gas turbine engine.

In another aspect, the present subject matter is directed to a stator vane for a gas turbine engine defining an axial centerline. The stator vane includes an inner band, an outer band spaced apart from the inner band in a radial direction extending orthogonally outward from the axial centerline, and an airfoil extending between the inner and outer bands. Additionally, the stator vane includes a first wall extending outward from at least one of the inner or outer bands in the radial direction and a second wall extending outward from the at least one of the inner or outer bands in the radial direction. The second wall is spaced apart from the first wall along the axial centerline such that the first and second walls define a channel therebetween. Furthermore, the second wall further defines a passage extending therethrough. Moreover, the sealing assembly includes a leaf seal partially positioned within the channel and a seal holder coupled to the second wall. In addition, the sealing assembly includes a spring compressed between the seal holder and the leaf seal such that the leaf seal is in sealing engagement with the first wall. Furthermore, the sealing assembly includes a pin extending through the passage defined by the second wall to couple the seal holder and the leaf seal such that the pin is thermally unconstrained by the second wall during operation of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
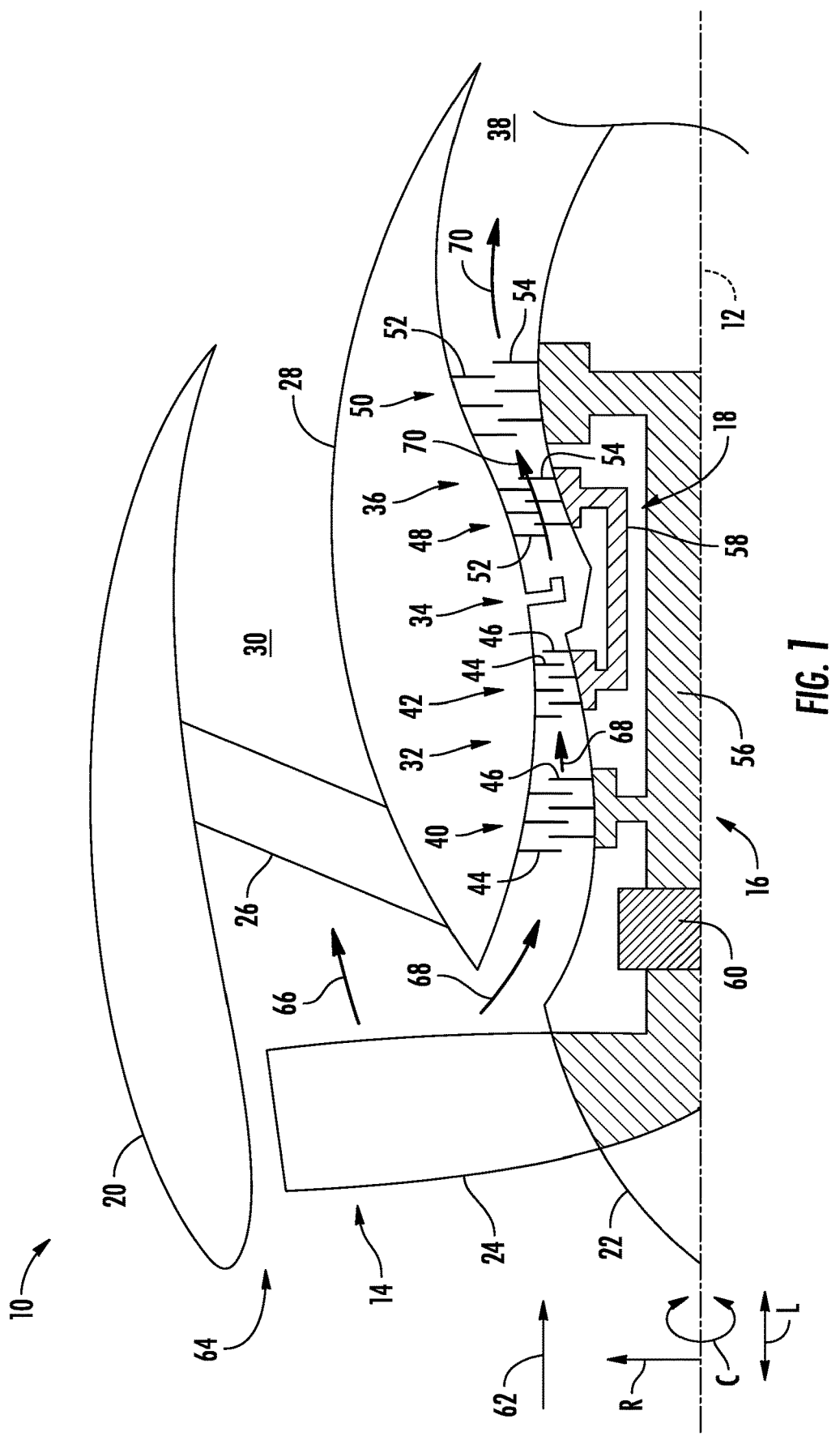
FIG. 1 is a schematic cross-sectional view of one embodiment of a gas turbine engine.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a sealing assembly for a gas turbine engine. As will be described below, the one or more of the disclosed sealing assemblies may be configured to seal a gap(s) defined between adjacent stationary components of the gas turbine engine. For example, in one embodiment, a sealing assembly(ies) provides a seal between the aft end of a combustor liner of the engine and the forward end of an adjacent stator vane of the engine. Thus, in such an embodiment, the sealing assembly(ies) reduces or prevents combustion gases from exiting a hot gas path of the engine between through the gap(s) between the combustor liner and the stator vane.

Each sealing assembly includes a leaf seal, a seal holder, one or more springs, and one or more pins. More specifically, the leaf seal is partially positioned within a channel defined between first and second walls of a stationary gas turbine engine component (e.g., an inner or outer band of a stator vane) such that the leaf seal is in contact with the first wall. Furthermore, the seal holder is coupled to the second wall. In one embodiment, the seal holder may include hooks that wrap around the second wall, thereby securing the seal holder to the second wall. Moreover, the spring(s) is positioned within the channel and compressed between the seal holder and the leaf seal such that the leaf seal is in sealing engagement with the first wall. Additionally, the pin(s) extends through a passage(s) defined by the second wall to couple the seal holder and the leaf seal. For example, in one embodiment, the passage(s) may correspond to a notch(es) within the second wall.

The passage(s) defined by the second wall permits unconstrained thermal growth of the pin(s) during operation (e.g., thermal cycling) of the gas turbine engine. In certain instances, the stationary component is formed from a composite material, while the components of the sealing assembly (e.g., the leaf seal, the seal holder, the spring(s), and the pin(s)) are formed from a metallic material. In such instances, the stationary component and the sealing assembly thermally expand and contract at differing rates. In this respect, the passage(s) defined by the second wall is larger than the pin(s) extending therethrough. As such, the pin(s) is spaced apart from the surface(s) of the second wall defining the passage(s), thereby allowing the pin(s) to thermally expand and contract without being constrained by the stationary component. Thus, the disclosed sealing assembly permits metallic leaf seals to be coupled to the composite gas turbine engine components.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. Such a configuration is referred to as a closed rotor engine. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween. However, in alternative embodiments, the engine 10 may have an open rotor configuration in which the nacelle 20 is not present.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. In other embodiments, the LP shaft 56 may directly drive the fan 14 (i.e., the engine 10 does not include the gearbox 60). The combustion gases 70 then exit the engine 10 through the exhaust section 38.

Figure 2:
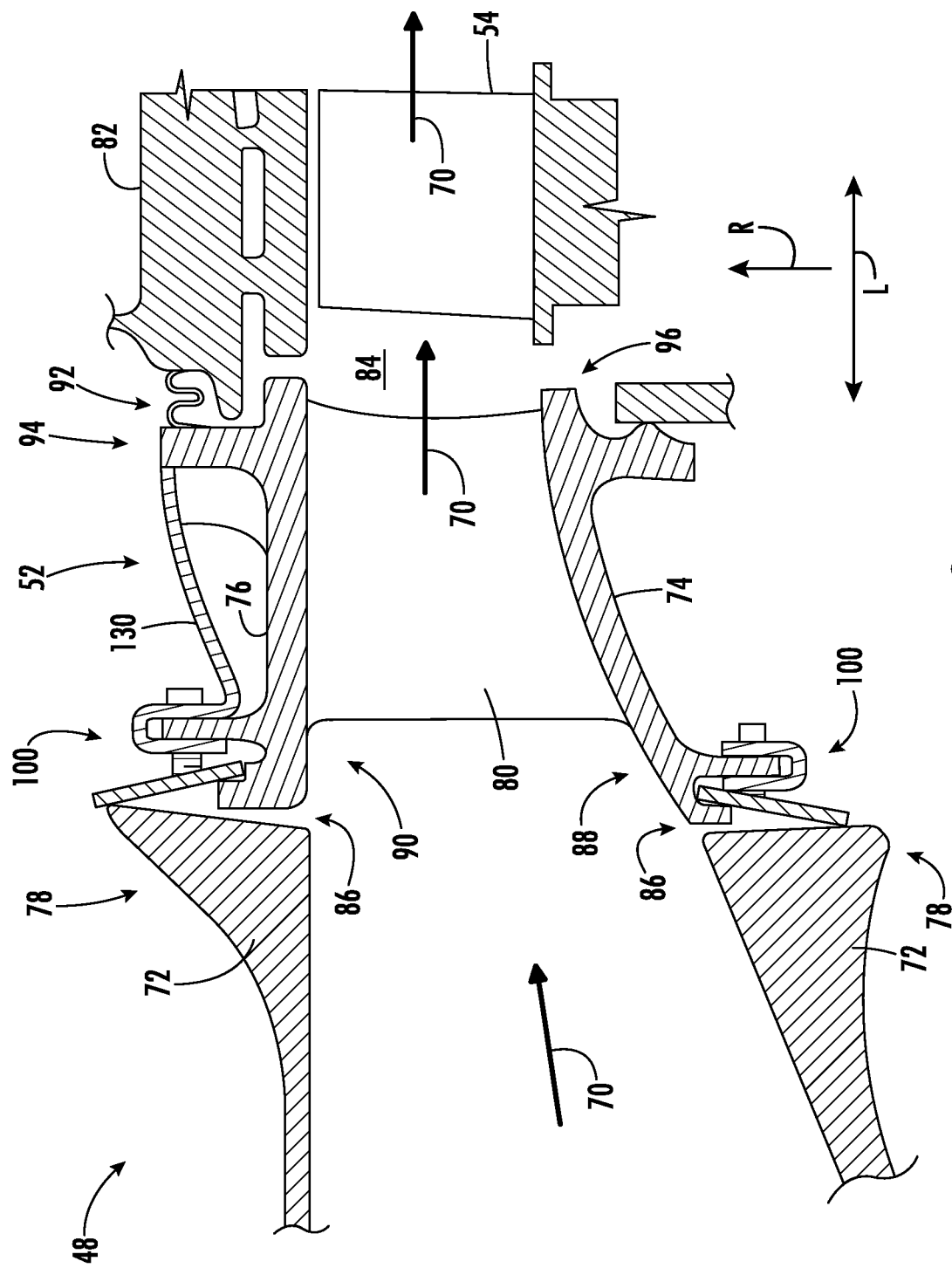
FIG. 2 is a partial cross-sectional side view of one embodiment of a turbine section of a gas turbine engine, particularly illustrating a pair of sealing assemblies in sealing engagement with a forward end of a stator vane of the engine.

FIG. 2 is a partial cross-sectional side view of one embodiment of the HP turbine 48 of the gas turbine engine 10. More specifically, FIG. 2 illustrates a first row of the stator vanes 52 and a first row of the rotor blades 54 of the HP turbine 48. As shown, the first row of stator vanes 52 is positioned downstream (i.e., relative to the flow of combustion gases 70) of a combustor casing 72 of the combustion section 34. Each stator vane 52 includes an inner band 74 and outer band 76 positioned outward of and a spaced apart from the inner band 74 in the radial direction R. The inner and outer bands 74, 76 are, in turn, positioned adjacent to a downstream end 78 of the combustor casing 72. Furthermore, each stator vane 52 includes an airfoil 80 extending between the inner and outer bands 74, 76 in the radial direction R. The first row of rotor blades 54 is positioned adjacent to and downstream of the first row of stator vanes 52. Additionally, a shroud 82 is positioned outward of the first row of rotor blades 54 in the radial direction R. Moreover, the shroud 82 encases or otherwise surrounds the first row of rotor blades 54 such that the shroud 82 is adjacent to the outer band 76.

Furthermore, the HP turbine 48 includes one or more seals or sealing assemblies. In general, the seal(s)/sealing assembly(ies) reduce or prevent the combustion gases 70 from exiting a hot gas path 84 flowing through the combustion section 34 and the turbine section 36. As shown, in several embodiments, one or more sealing assemblies 100 seal a gap 86 between the combustor casing 72 and the first row of stator vanes 52. For example, in the illustrated embodiment, a sealing assembly 100 sealingly engages the downstream end 78 of the combustor casing 72 and a forward end 88 of the inner band 74 of each stator vane 52. Moreover, in the illustrated embodiment, another sealing assembly 100 sealingly engages the downstream end 78 of the combustor casing 72 and a forward end 90 of the outer band 76 of each stator vane 52. The configuration of the sealing assemblies 100 will be described in detail below. In addition, a W-seal 92 may sealingly engage an aft end 94 of the outer band 76 of each stator vane 52 and the shroud 82.

Figure 3:
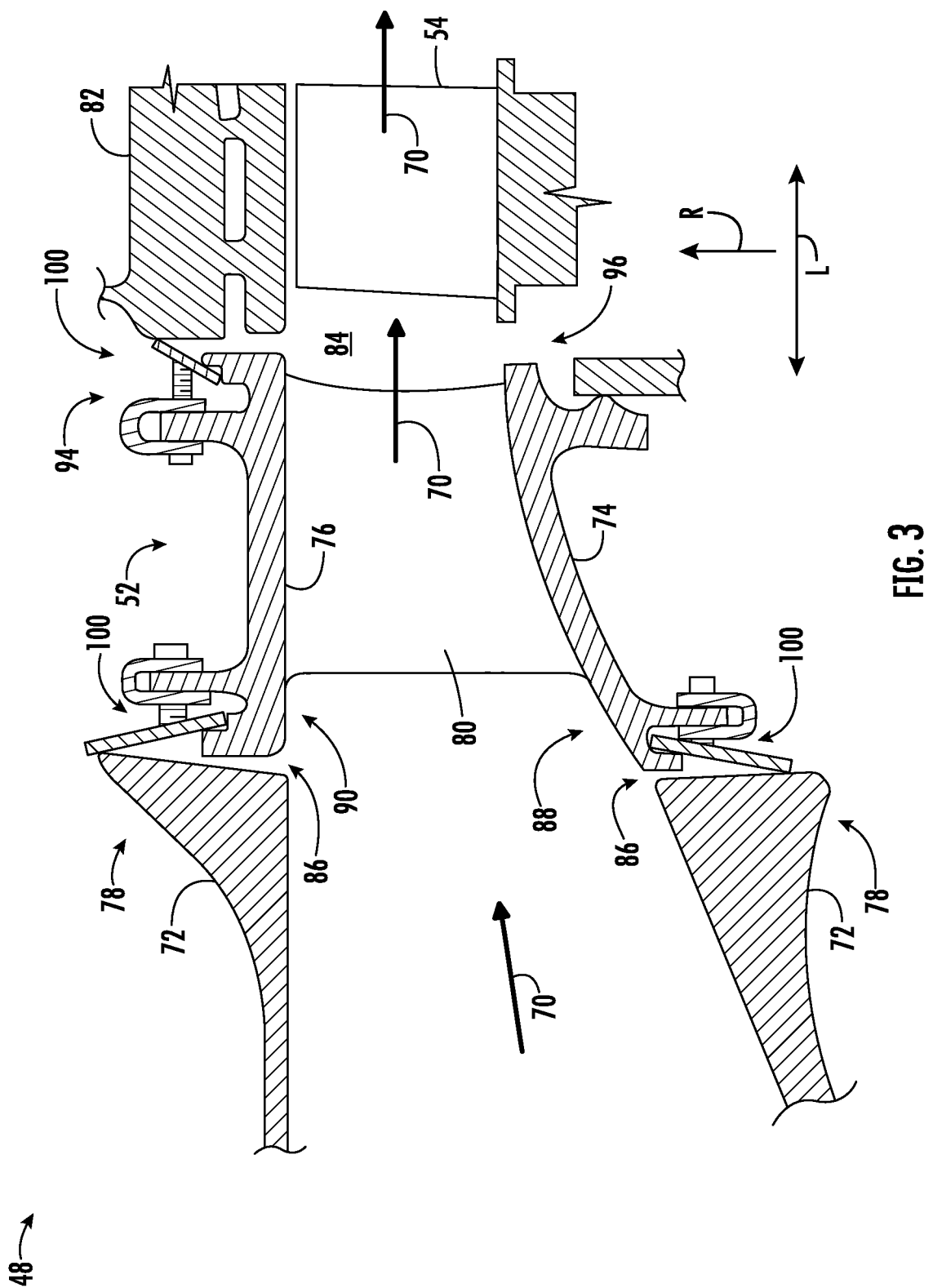
FIG. 3 is a partial cross-sectional side view of another embodiment of a turbine section of a gas turbine engine, particularly illustrating a sealing assembly in sealing engagement with an aft end of a stator vane of the engine.

FIG. 3 is a partial cross-sectional side view of another embodiment of the HP turbine 48 of the gas turbine engine 10. As shown, the HP turbine 48 illustrated in FIG. 3 is configured similarly to the HP turbine 48 shown in FIG. 2. For example, like the HP turbine 48 shown in FIG. 2, the HP turbine 48 of FIG. 3 includes sealing assemblies 100 that seal the gap 86 between the combustor casing 72 and the first row of stator vanes 52. However, unlike the HP turbine 48 shown in FIG. 2, the HP turbine 48 of FIG. 3 includes a sealing assembly 100 that sealingly engages the aft end 94 of the outer band 76 of each stator vane 52 and the shroud 82.

The sealing configurations shown in FIGS. 2 and 3 are provided as exemplary embodiments. As such, the engine 10 may include any other suitable type or configuration of seal(s) or sealing assembly(ies) in lieu of or in addition to the sealing assemblies 100 and the W-seals 92 shown in FIGS. 2 and 3. In addition, although not shown in FIGS. 2 and 3, in other embodiments, a sealing assembly 100 may sealingly engage an aft end 96 of the inner band 74 of each stator vane 52

The configuration of the gas turbine engine 10 described above and shown in FIGS. 1-3 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 4:
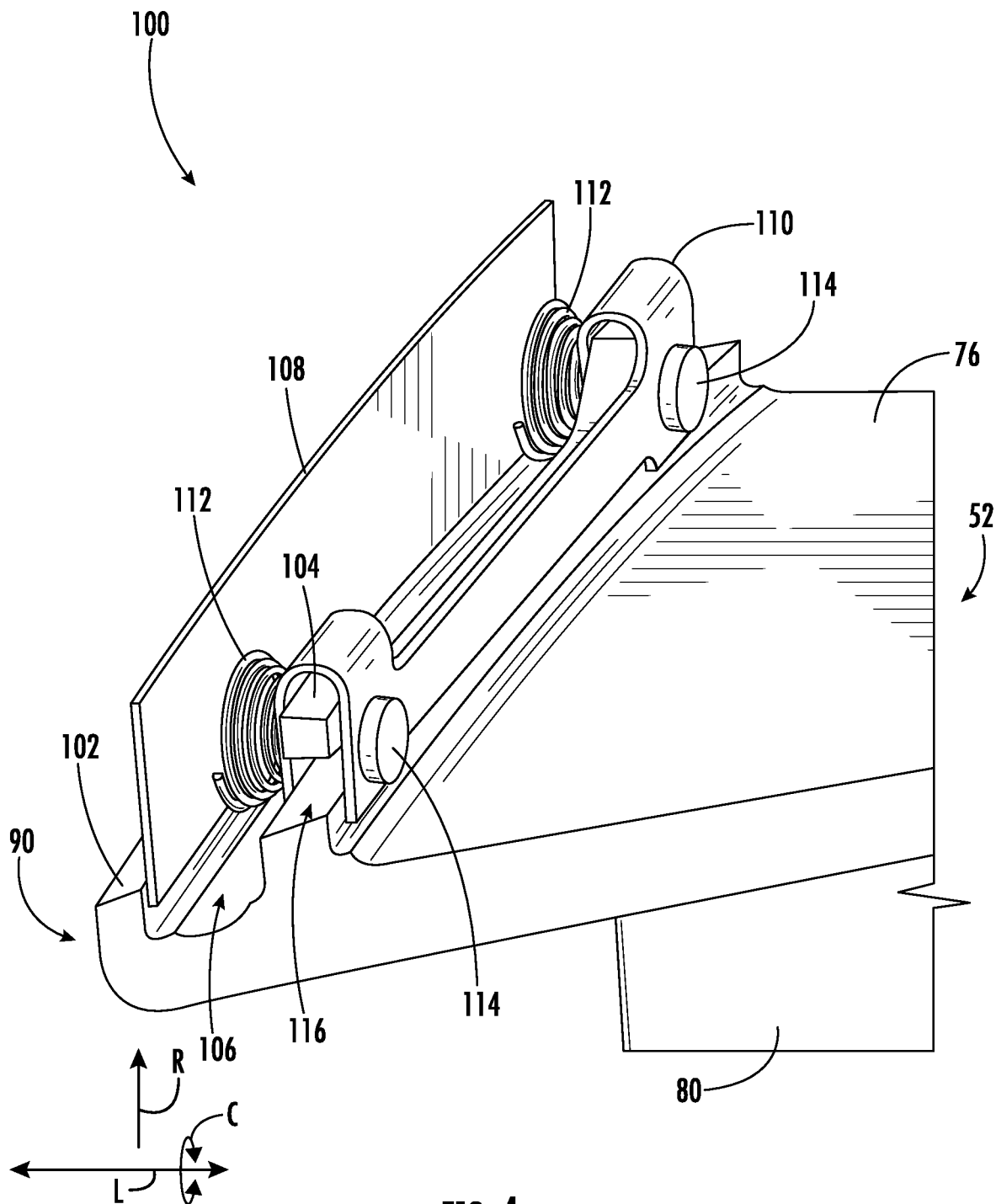
FIG. 4 is a perspective view of one embodiment of a sealing assembly for a gas turbine engine, particularly illustrating the sealing assembly including a leaf seal, a seal holder, a pair of pins, and a pair of springs.

FIG. 4 is a perspective view of one embodiment of a sealing assembly 100 for a gas turbine engine. In general, the sealing assembly 100 will be described in the context of a stator vane 52 of the gas turbine engine 10 shown in FIGS. 1-3. However, the disclosed sealing assembly 100 may be used with any other suitable component(s) of the gas turbine engine 10 or with any suitable component(s) of another gas turbine engine.

As shown in FIG. 4, in several embodiments, the sealing assembly 100 is sealing engagement with the forward end 90 of the outer band 76 of one of the stator vanes 52. In such embodiments, the stator vane 52 includes a first wall 102 extending outward from the forward end 90 of the outer band 76 in the radial direction R. Furthermore, in such embodiments, the stator vane 52 includes a second wall 104 extending outward from the forward end 90 of the outer band 76 in the radial direction R. The second wall 104 is spaced apart from and positioned aft of (i.e., downstream relative to the flow of the combustion gases 70) the first wall 102. In this respect, the first and second walls 102, 104 define a channel 106 positioned therebetween along the longitudinal direction L. As will be described below, a leaf seal 108 of the sealing assembly 100 is partially positioned within the channel 106. In some embodiments, first and second walls may extend inward from the forward end 88 of the inner band 74 in the radial direction R in addition to or in lieu of the first and second walls 102, 104 extending outward from the outer band 76. Moreover, in further embodiments, first and second walls may extend inward/outward from the aft end 96 of the inner band 74 and/or the aft end 94 of the outer band 76 in the radial direction R in addition to or in lieu of the first and second walls extending inward/outward from the forward ends 88, 90 end of the inner and/or outer bands 74, 76.

In several embodiments, the sealing assembly 100 includes the leaf seal 108, a seal holder 110, one or more springs 112, and one or more pins 114. More specifically, as shown, the leaf seal 108 is partially positioned within the channel 106 defined between the first and second walls 102, 104. Furthermore, the seal holder 110 is coupled to the second wall 104. For example, in some embodiments, the seal holder 110 slides over the second wall 104 in a sleeve-like manner. In addition, a pair of springs 112 are compressed between the seal holder 110 and the leaf seal 108 such that the leaf seal 108 is in sealing engagement with the first wall 102 and an adjacent component of the engine 10, such as the downstream end 78 of the combustor casing 72 (FIG. 2). Moreover, as will be described below, a pair of pins 114 extend through a pair of passages 116 (one is shown) defined by the second wall 104 to couple the seal holder 110 and the leaf seal 108. The pins 114 are, in turn, spaced apart from each other in the circumferential direction C. However, in alternative embodiments, the sealing assembly 100 may include any other suitable number of springs 112, pins 114, and passages 116.

Figure 5:
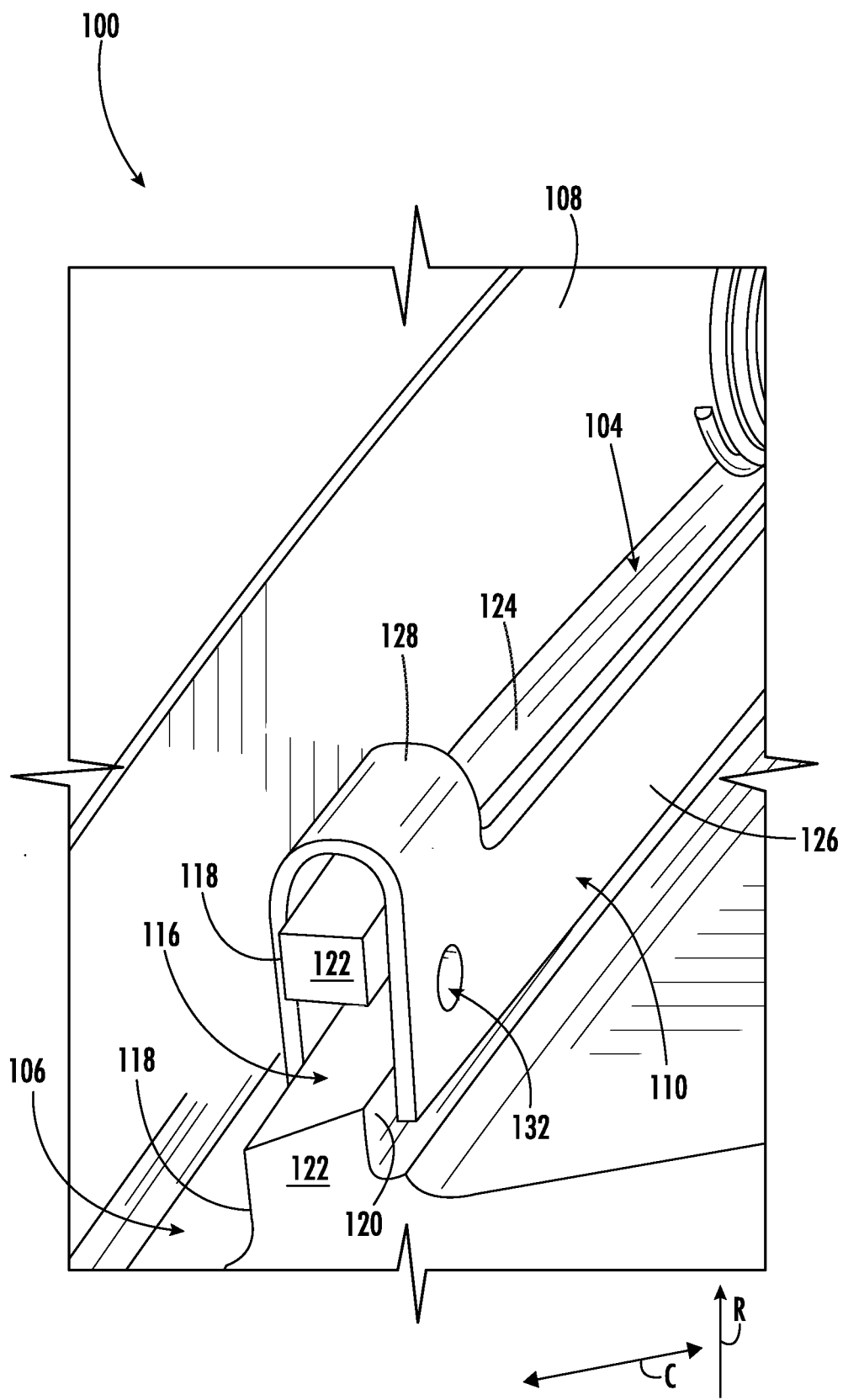
FIG. 5 is an enlarged, partial perspective view of the sealing assembly shown in FIG. 4, with the pins and springs removed for clarity.

FIG. 5 is an enlarged, partial perspective view of the sealing assembly 100, with the springs 112 and the pins 114 removed for clarity. As shown, the second wall 104 includes various surfaces. More specifically, the second wall 104 includes a first surface 118 defining a portion of the channel 106 and a second surface 120 spaced apart from the first surface 118 in the longitudinal direction L. Furthermore, the first and second surfaces 118, 120 extend in the radial and circumferential directions R, C. Additionally, the second wall 104 includes a third surface 122 extending between the first and second surfaces 118, 120. As such, the third surface 122 extends in the longitudinal and radial directions L, R. Moreover, the second wall 104 includes a fourth surface 124 extending between the first and second surfaces 118, 120, with the fourth surface 124 being orthogonal to the third surface 122. As such, the fourth surface 124 extends in the longitudinal and circumferential directions L, C.

As mentioned above, in some embodiments, the seal holder 110 is coupled to the second wall 104 by sliding the seal holder 110 over the second wall 104 in a sleeve-like manner. More specifically, the seal holder 110 includes a seal holder body 126 and a pair of seal holder hooks 128 (one is shown in FIG. 5) coupled to the body 126. As shown, when the seal holder 110 is coupled to the second wall 104, the seal holder body 126 is in contact with the second surface 120 of the second wall 104. Thus, the seal holder body 126 is spaced apart from the channel 106 by the second wall 104 in the longitudinal direction L. Furthermore, the seal holder hooks 128 extend outward from the seal holder body 126 and around the fourth surface 124 of the second wall 104 such that a portion of each hook 128 is in contact with the first surface 118 of the second wall 104. However, in alternative embodiments, the seal holder 110 may be coupled to the second wall 104 in any other suitable manner.

In addition, the seal holder 110 may include a support arm 130 (shown in FIG. 2). Specifically, the seal holder 110 may include the support arm 130 when the seal assembly 100 is in sealing engagement with the outer band 76 of a stator vane 52. In such instances, the support arm 130 prevents the seal holder 110 from rotating relative to the second wall 104. As such, the support arm 130 may extend outward from the seal holder body 126 in the longitudinal direction L. For example, as shown in FIG. 2, when the sealing assembly 100 is in sealing engagement with the forward end 90 of the outer band 76, the support arm 130 may extend downstream (i.e., relative to the flow of the combustion gases 70) from the seal holder body 126 in the longitudinal direction L. Conversely, when the sealing assembly 100 is in sealing engagement with the aft end 94 of the outer band 76, the support arm 130 may extend upstream (i.e., relative to the flow of the combustion gases 70) from the seal holder body 126 in the longitudinal direction L. However, in some embodiments, the seal holder 110 may not include a support arm 130, such as when the sealing assembly 100 is in sealing engagement with the inner band 74 of the stator vane 52.

Referring again to FIG. 5, as mentioned above, in several embodiments, the second wall 104 defines a pair of passages 116 through which the pins 114 (FIG. 4) extend. As shown in FIG. 5, the passages 116 extend through the second wall 104 from the first surface 118 to the second surface 120. In this respect, the seal holder body 126 defines a pair of apertures 132 (one is shown). Each aperture 132 is, in turn, aligned with one of the passages 116 in the radial and circumferential directions R, C to permit the pins 114 to extend through the seal holder 110 and the passages 116.

Figure 6:
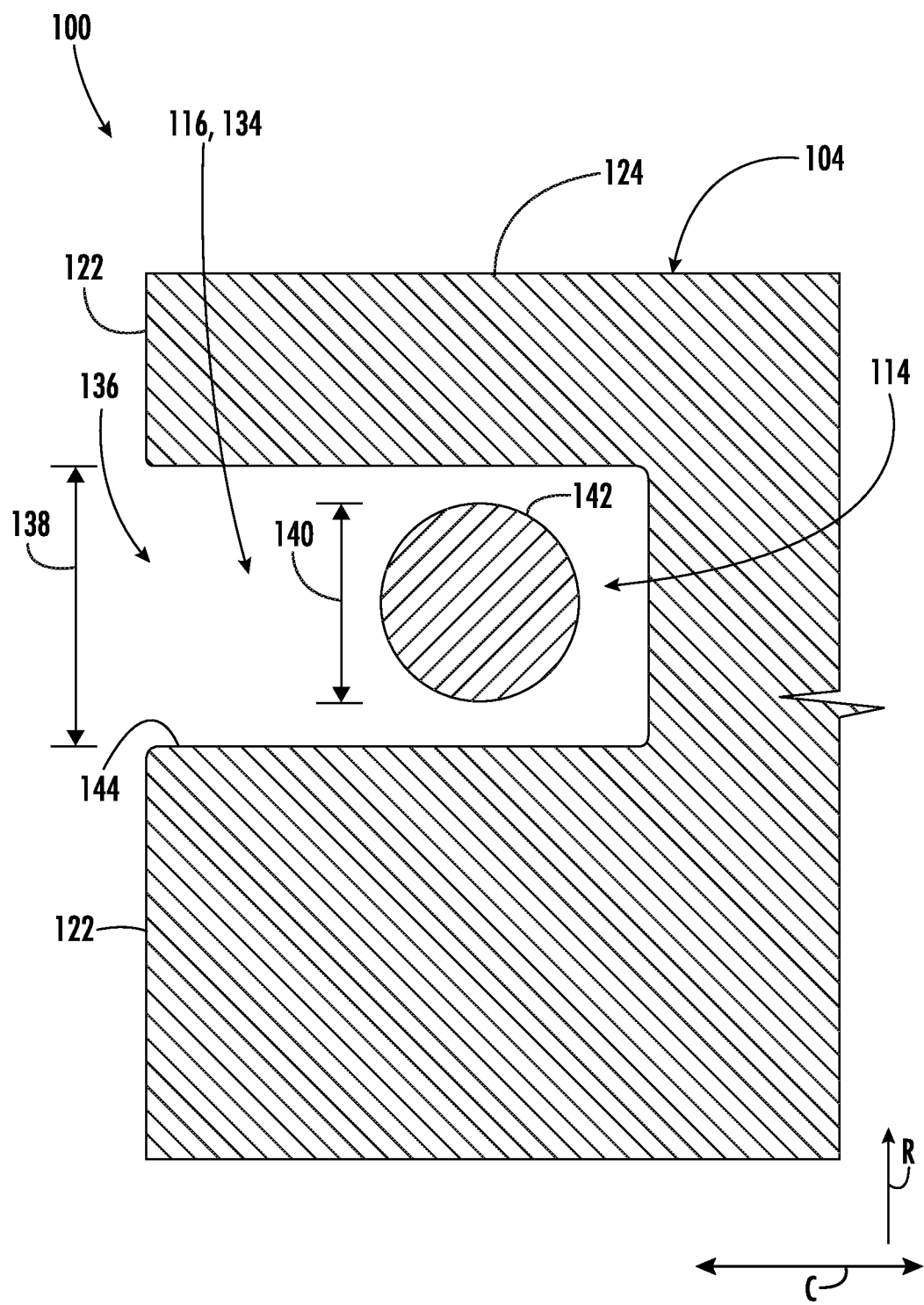
FIG. 6 is a partial cross-sectional view of the sealing assembly shown in FIGS. 4 and 5, with the leaf seal, the seal holder, and the springs removed for clarity.

FIG. 6 is a partial, cross-sectional view of the sealing assembly 100, with the leaf seal 108, the seal holder 110, and the springs 112 removed for clarity. As shown, in several embodiments, the passage 116 is configured as a notch 134. Specifically, in such embodiments, the notch 134 extends into the second wall 104 in the circumferential direction C from an opening 136 defined by the third surface 122 of the second wall 104. The notch 134 also extends from the first surface 118 of the second wall 104 through the second surface 120 of the second wall 104 in the longitudinal direction L. However, in alternative embodiments, the passage 116 may be configured in any other suitable manner. For example, in one alternative embodiment, the passage 116 may be configured as a through hole extending between the first and second surfaces 118, 120 of the second wall 104, with the through hole being spaced apart from the third surface 122 of the second wall 104 in the circumferential direction C.

Additionally, the passages 116 are sized to accommodate unconstrained thermal growth of the pins 114 extending therethrough during operation of the engine 10. In several embodiments, the stator vane 52 is formed from a composite material (e.g., a ceramic matrix composite (CMC) material), while the components of the sealing assembly 100 (e.g., the leaf seal 108, the seal holder 110, the spring(s) 112, and the pin(s) 114) are formed from a metallic material. In such embodiments, the stator vane 52 and the sealing assembly 100 thermally expand and contract at differing rates during operation (e.g., thermal cycling) of the engine 10. As such, the passages 116 defined by the second wall 104 are larger than the pins 114 extending therethrough. Specifically, the diameter (indicated by arrow 138) of each passage 116 is greater than the diameter (indicated by arrow 140) of a pin shaft 142 of the pin 114 extending through such passage 116. The diameters 138 of the passages 116 may, in turn, be the smallest dimension of the passages 116 in a plane defined by the radial and circumferential direction R, C. In this respect, each pin 114 is spaced apart from a passage surface 144 of the second wall 104 defining the corresponding passage 116. For example, in one embodiment, each pin 114 is spaced apart from the corresponding passage surface 144 in 360 degrees. Thus, the pins 114 can thermally expand and contract without being constrained by the second wall 104 during operation of the engine 10, thereby permitting a metallic sealing assembly 100 to be coupled to a composite component of the gas turbine engine 10 (e.g., one of the stator vanes 52).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A sealing assembly for a gas turbine engine, the sealing assembly comprising: a first gas turbine wall; a second gas turbine wall spaced apart from the first gas turbine wall, the first and second gas turbine walls defining a channel therebetween, the second gas turbine wall further defining a passage extending therethrough; a leaf seal partially positioned within the channel; a seal holder coupled to the second gas turbine wall; a spring compressed between the seal holder and the leaf seal such that the leaf seal is in sealing engagement with the first gas turbine wall; and a pin extending through the passage defined by the second gas turbine wall to couple the seal holder and the leaf seal such that the pin is thermally unconstrained by the second wall during operation of the gas turbine engine.

The sealing assembly of one or more of these clauses, wherein the pin comprises a pin shaft having a pin shaft diameter less than a diameter of the passage.

The sealing assembly of one or more of these clauses, wherein the second gas turbine wall comprises a passage surface defining the passage, the pin shaft extending through the passage such that the pin shaft is spaced apart from the passage surface.

The sealing assembly of one or more of these clauses, wherein the second gas turbine wall comprises a first surface partially defining the channel, a second surface spaced from the first surface, and a third surface extending between the first and second surfaces, the passage extending from the first surface to the second surface.

The sealing assembly of one or more of these clauses, wherein the passage comprises a notch.

The sealing assembly of one or more of these clauses, wherein the third surface of the second gas turbine wall defines an opening of the notch.

The sealing assembly of one or more of these clauses, wherein the seal holder comprises a body and a hook coupled to the body, the body being in contact with the second surface, at least a portion of the hook being in contact with the first surface.

The sealing assembly of one or more of these clauses, wherein the second gas turbine wall further comprises a fourth surface extending between the first and second surfaces, the fourth surface being orthogonal to the third surface, the hook extending from the body around the fourth surface to contact the first surface.

The sealing assembly of one or more of these clauses, wherein the seal holder comprises a support arm configured to prevent rotation of the seal holder relative to the second gas turbine wall.

The sealing assembly of one or more of these clauses, wherein the first and second gas turbine walls are formed from a composite material.

The sealing assembly of one or more of these clauses, wherein the leaf seal, the seal holder, the spring, and the pin are formed from a metallic material.

A stator vane for a gas turbine engine defining an axial centerline, the stator vane comprising: an inner band; an outer band spaced apart from the inner band in a radial direction extending orthogonally outward from the axial centerline; an airfoil extending between the inner and outer bands; a first wall extending outward from at least one of the inner or outer bands in the radial direction; a second wall extending outward from the at least one of the inner or outer bands in the radial direction, the second wall being spaced apart from the first wall along the axial centerline, the first and second walls defining a channel therebetween, the second wall further defining a passage extending therethrough; and a sealing assembly comprising: a leaf seal partially positioned within the channel; a seal holder coupled to the second wall; a spring compressed between the seal holder and the leaf seal such that the leaf seal is in sealing engagement with the first wall; and a pin extending through the passage defined by the second wall to couple the seal holder and the leaf seal such that the pin is thermally unconstrained by the second wall during operation of the gas turbine engine.

The stator vane of one or more of these clauses, wherein the sealing assembly sealingly engages the outer band.

The stator vane of one or more of these clauses, wherein the seal holder comprises a support arm configured to prevent rotation of the seal holder relative to the second wall.

The stator vane of one or more of these clauses, wherein the sealing assembly sealingly engages the inner band.

The stator vane of one or more of these clauses, wherein the at least one of the inner or outer bands extends along the axial centerline from a forward end to an aft end, the sealing assembly sealingly engaging the at least one of the inner or outer bands adjacent to the forward end.

The stator vane of one or more of these clauses, wherein the at least one of the inner or outer bands extends along the axial centerline from a forward end to an aft end, the sealing assembly sealingly engaging the at least one of the inner or outer bands adjacent to the aft end.

The stator vane of one or more of these clauses, wherein the pin comprises a pin shaft and the second wall comprises a passage surface defining the passage, the pin shaft extending through the passage such that the pin shaft is spaced apart from the passage surface.

The stator vane of one or more of these clauses, wherein the second wall comprises a first surface partially defining the channel and a second surface spaced from the first surface, the passage comprising a notch extending from the first surface to the second surface.

The stator vane of one or more of these clauses, wherein the inner and outer bands are formed from a composite material and the leaf seal, the seal holder, the spring, and the pin are formed from a metallic material.

What is claimed is:

1. A sealing assembly for a gas turbine engine, the sealing assembly comprising:
   a first gas turbine wall;
   a second gas turbine wall spaced apart from the first gas turbine wall, the first and second gas turbine walls defining a channel therebetween, the second gas turbine wall including a passage surface defining a passage extending through the second gas turbine wall;
   a leaf seal partially positioned within the channel;
   a seal holder coupled to the second gas turbine wall;
   a spring compressed between the seal holder and the leaf seal such that the leaf seal is in sealing engagement with the first gas turbine wall; and
   a pin extending through the passage defined by the second gas turbine wall to couple the seal holder and the leaf seal, the pin including a shaft that is spaced apart from the passage surface of the second gas turbine wall such that the pin is thermally unconstrained by the second gas turbine wall during operation of the gas turbine engine,
   wherein the second gas turbine wall comprises a first surface partially defining the channel, a second surface spaced from the first surface, and a third surface extending between the first and second surfaces, the passage extending from the first surface to the second surface, the passage comprising a notch, the third surface of the second gas turbine wall defining an opening of the notch, the notch extending from the opening into the second gas turbine wall in a circumferential direction, the circumferential direction extending concentrically around an axial centerline of the gas turbine engine.

2. The sealing assembly of claim 1, wherein the shaft has a shaft diameter less than a passage diameter of the passage.

3. The sealing assembly of claim 1, wherein the seal holder comprises a body and a hook coupled to the body, the body being in contact with the second surface, at least a portion of the hook being in contact with the first surface.

4. The sealing assembly of claim 3, wherein the second gas turbine wall further comprises a fourth surface extending between the first and second surfaces, the fourth surface being orthogonal to the third surface, the hook extending from the body around the fourth surface to contact the first surface.

5. The sealing assembly of claim 1, wherein the seal holder comprises a support arm configured to prevent rotation of the seal holder relative to the second gas turbine wall.

6. The sealing assembly of claim 1, wherein the first and second gas turbine walls are formed from a composite material and the leaf seal, the seal holder, the spring, and the pin are formed from a metallic material.

7. A stator vane for a gas turbine engine defining an axial centerline, the stator vane comprising:
   an inner band;
   an outer band spaced apart from the inner band in a radial direction extending orthogonally outward from the axial centerline;
   an airfoil extending between the inner and outer bands;
   a first wall extending outward from at least one of the inner or outer bands in the radial direction;
   a second wall extending outward from the at least one of the inner or outer bands in the radial direction, the second gas turbine wall including a first surface, a second surface spaced apart from the first surface in a longitudinal direction extending parallel to the axial centerline, and a third surface extending along the longitudinal direction from the first surface to the second surface, the first gas turbine wall and the first surface of the second gas turbine wall defining a channel therebetween, the second gas turbine wall including a passage surface defining a passage extending through the second gas turbine wall in the longitudinal direction from the first surface to the second surface, the passage corresponding to a notch that extends into the second wall in a circumferential direction from an opening defined by the third surface of the second wall, the notch being closed by the second wall at an opposite side from the opening; and
   a sealing assembly comprising:
      a leaf seal partially positioned within the channel;
      a seal holder coupled to the second wall;
      a spring compressed between the seal holder and the leaf seal such that the leaf seal is in sealing engagement with the first wall; and
      a pin extending through the notch and the first and second surfaces of the second gas turbine wall in the longitudinal direction to couple the seal holder and the leaf seal, the pin including a shaft that is spaced apart from the passage surface of the second gas turbine wall such that the pin is thermally unconstrained by the second wall during operation of the gas turbine engine.

8. The stator vane of claim 7, wherein the sealing assembly sealingly engages the outer band.

9. The stator vane of claim 8, wherein the seal holder comprises a support arm configured to prevent rotation of the seal holder relative to the second wall.

10. The stator vane of claim 7, wherein the sealing assembly sealingly engages the inner band.

11. The stator vane of claim 7, wherein the at least one of the inner or outer bands extends along the axial centerline from a forward end to an aft end, the sealing assembly sealingly engaging the at least one of the inner or outer bands adjacent to the forward end.

12. The stator vane of claim 7, wherein the at least one of the inner or outer bands extends along the axial centerline from a forward end to an aft end, the sealing assembly sealingly engaging the at least one of the inner or outer bands adjacent to the aft end.

13. The stator vane of claim 7, wherein the inner and outer bands are formed from a composite material and the leaf seal, the seal holder, the spring, and the pin are formed from a metallic material.

14. A sealing assembly for a gas turbine engine, the sealing assembly comprising:
   a first gas turbine wall;
   a second gas turbine wall spaced apart from the first gas turbine wall, the second gas turbine wall including a first surface, a second surface spaced apart from the first surface in a longitudinal direction extending parallel to an axial centerline of the gas turbine engine, and a third surface extending along the longitudinal direction from the first surface to the second surface, the first gas turbine wall and the first surface of the second gas turbine wall defining a channel therebetween, the second gas turbine wall including a passage surface defining a notch extending through the second gas turbine wall in the longitudinal direction from the first surface to the second surface, the notch further extending from the third surface into the second gas turbine wall in a circumferential direction extending concentrically around the axial centerline;

a leaf seal partially positioned within the channel;

a seal holder coupled to the second gas turbine wall;

a spring compressed between the seal holder and the leaf seal such that the leaf seal is in sealing engagement with the first gas turbine wall; and a pin including a shaft, the pin extending through the notch and the first and second surfaces of the second gas turbine wall in the longitudinal direction to couple the seal holder and the leaf seal, the shaft and the passage surface defining a gap therebetween when the pin extends through the passage such that the pin is thermally unconstrained by the second gas turbine wall during operation of the gas turbine engine.

\* \* \* \* \*